UNITED STATES PATENT OFFICE.

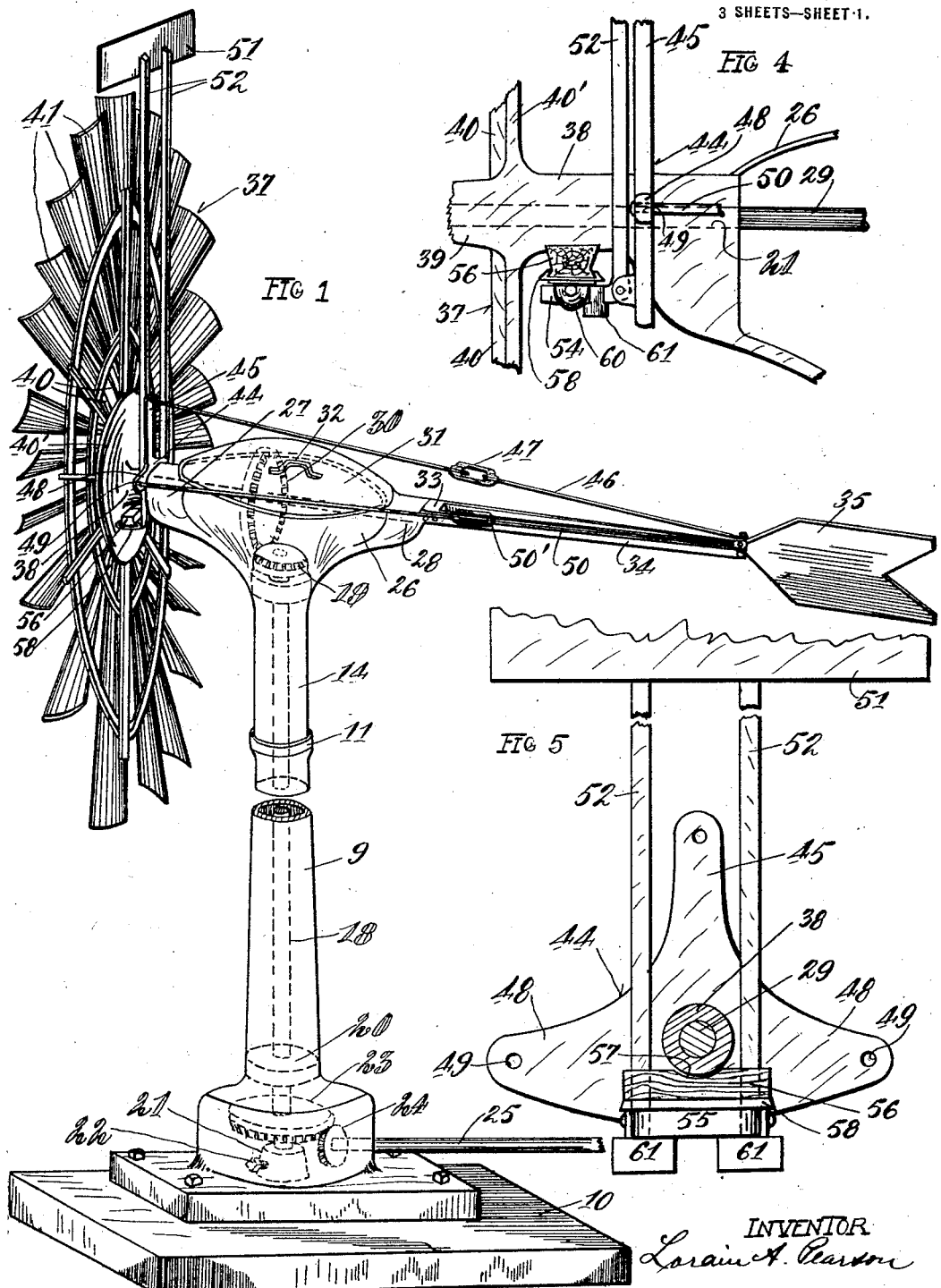

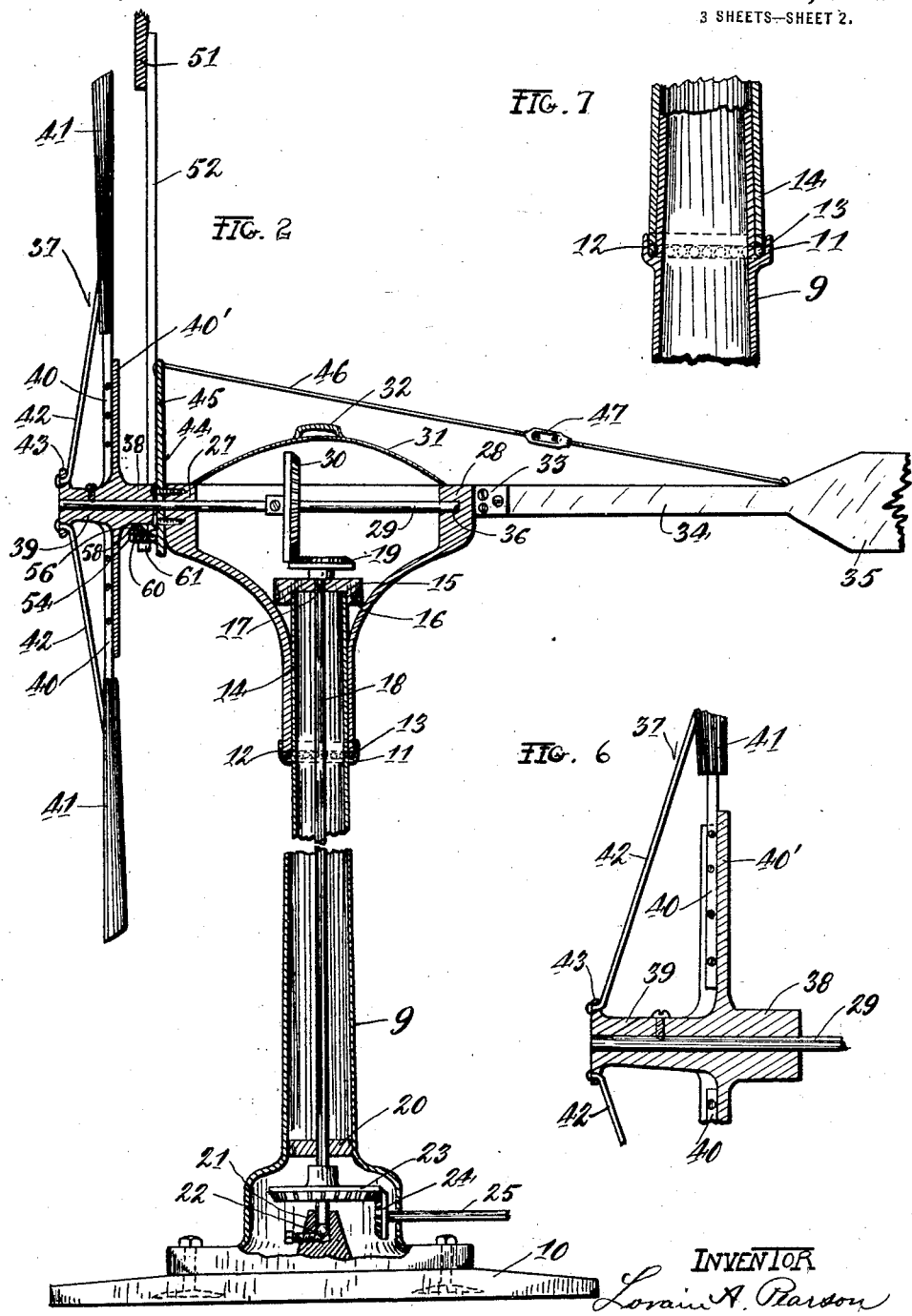

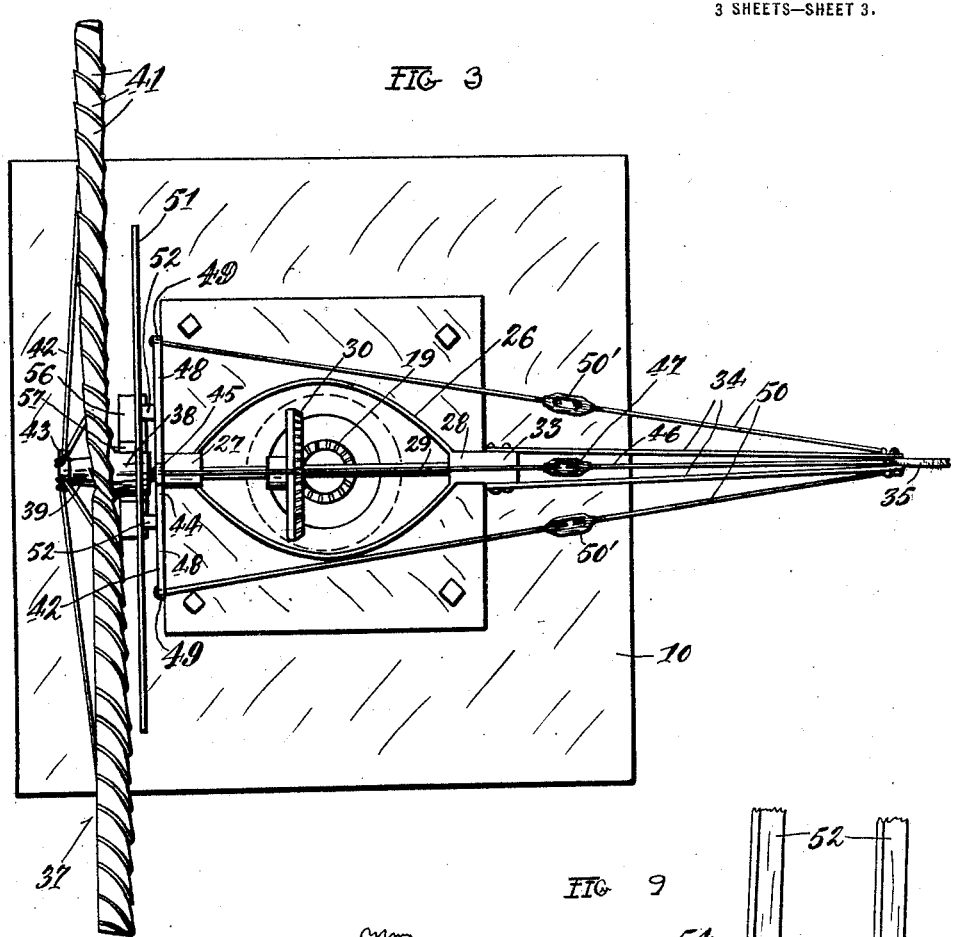
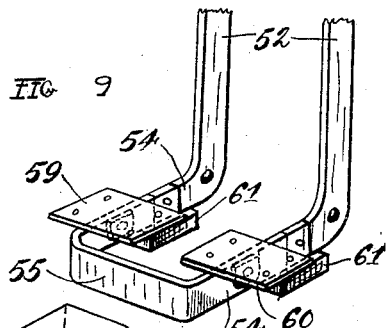
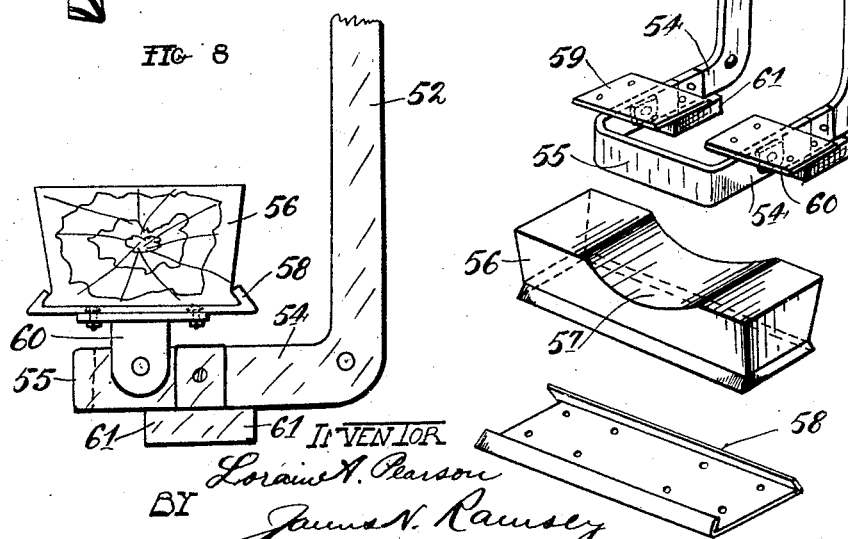

LORAIN A. PEARSON, OF WEST MILTON, OHIO.

WINDMILL.

1,408,905.  Specification of Letters Patent. Patented Mar. 7, 1922.

Application filed December 17, 1920. Serial No. 431,442.

*To all whom it may concern:*

Be it known that I, LORAIN A. PEARSON, a citizen of the United States, residing at West Milton, in the county of Miami and State of Ohio, have invented certain new and useful Improvements in Windmills, of which the following is a specification.

My invention relates more particularly to means for automatically regulating the speed of the wind-wheel in excessive winds.

The object of my invention is to provide means whereby the windmill is caused to automatically run at uniform speed at all times under varying velocities of wind, thereby with such regulation of speed the wind power may be used to drive electric generating machinery for isolated farm home lighting or community service both by direct lighting or charging of electric storage batteries and thereby indirect lighting. The use of such electric current will be the same in all its services and purposes as current distributed by the large electric central stations and provide means whereby the windwheel will be kept in perfect vertical alinement and the driving-shaft in perfect horizontal alinement.

My invention consists in providing a brake adapted to engage an extended hub of the wind-wheel and to be governed by a sail attached to said brake through the action of the wind thereon.

My invention further consists in providing a pivotally mounted turret having a wind-wheel mounted upon a drive-shaft supported in heavy bearings widely spaced apart in fixed relation to each other to give said wind-wheel a secure and firm anchorage in order to insure alinement and unvarying relation of the intermeshing gears and other parts of the device.

My invention further consists in providing, in a turret of unitary structure, such widely spaced apart bearings upon each side of the transmission gears centrally therebetween, whereby said gears are kept at right angles to each other, and whereby the windwheel will be kept in perfect vertical alinement and the drive-shaft will be kept in perfect horizontal alinement.

It will be noticed in this invention that all moving parts are housed for the reason that the countries in which this wind-mill will be used to the best advantage is where hot and strong winds prevail, drifting sands even through a very small crevice, and since the object is to transmit the wind's energy by rotary motion or by crank motion the life of the moving parts depend upon the exclusion of sand, which is thoroughly provided for in this invention thereby assuring continuity of service twenty four hours per day and every day in the year when there is sufficient breeze; also "safety first" is taken into consideration as to personal injury from moving parts thus it will be seen by this invention that the wind-mill is sand-proof, water-proof, weather-proof, wind-proof, fool-proof, and mechanical operation assured for the reason of the housing of moving parts.

It is said that ninety per cent of the windmills or engines now installed in the West are out of working order because they are out of alinement; working parts exposed to drifting sands cannot be kept well lubricated, therefore are quickly worn out, and lack of sufficient automatic speed regulation allows the speed of the wheel to be intermittent; a "run-a-way" would happen and a wobble caused by imperfect alinement would cause the wheel to wreck itself, but with my invention it will be clearly seen the automatic brake acts by the impulse of the wind before the wheel will act by the same impulse of the wind all of which is taken care of in this invention.

My invention also consists in the several parts and in the construction, combination and arrangement of parts as herein set forth and claimed.

In the drawings:

Fig. 1 is a perspective view of a windmill embodying my invention;

Fig. 2 is an elevation partly in vertical section;

Fig. 3 is a top or plan view of the windmill;

Fig. 4 is a side elevation of a portion of the hub, the wind-wheel, brake, turret, housing and drive shaft;

Fig. 5 is a front elevation of the sail, support and brake, the wind-wheel hub and shaft being shown in section;

Fig. 6 is a section through the hub of the wind-wheel showing the manner of mounting and attaching the blades;

Fig. 7 is a vertical section of a portion of the standard showing the ball-bearing mounting of the turret thereon.

Fig. 8 is a side elevation showing hinged joint, brake-shoe and bell-crank; and

Fig. 9 is a perspective view showing separate parts of hinged joint of brake-shoe and bell-crank.

In the embodiment of my invention as illustrated, and which shows a preferred construction, a hollow standard 9 is suitably mounted upon and bolted to a concrete base 10. Some distance below the top of the standard an annular upturned flange 11 is integrally formed thereon, thereby providing an annular ball-bearing groove 12 in which balls 13 rest. The lower end of tubular turret 14 enters said groove and rests upon said balls, whereby a ball-bearing contact between the parts is obtained, permitting the turret and the parts which it supports to freely rotate upon the upper end of said standard. The top of standard 9 is provided with cap 15 having a downwardly extending flange 16 and is bolted or otherwise suitably secured to the top of the standard. The cap 15 is provided with an opening 17 and forms a bearing and support for main shaft 18 extending through said opening and having a bevel gear 19 secured to its upper end. Its lower end is supported in bearings 20 and 21, bearing 21 having an adjustment 22 which engages the lower end of vertical shaft 18 and keeps gear 23, mounted thereon, in perfect mesh with gear 24 upon lead shaft 25.

The upper end of turret 14 is curved outwardly and forms a hollow oval housing 26 having in its ends bearing 27 and 28 respectively, in which, horizontal drive-shaft 29 is mounted, said drive-shaft being provided with a bevel gear 30 engaging and actuating bevel gear 19. A suitable cover 31 having handle 32 is mounted upon said housing.

It will be seen that bearings 27 and 28 are widely spaced apart and fixed relatively to each other and that there is an extended bearing surface between the lower portion of the turret and the upper portion of the standard, whereby bevel gears 30 and 19 are held in proper relation to each other throughout the various movements of the several parts. In this bevel gear transmitting power from main horizontal drive shaft to vertical drive shaft extending downward through the standard it will be seen that the shifting of the wind wheel by the rudder caused by variable winds the bevel gear on main power shaft will revolve around the bevel gear or vertical shaft without change or shifting of any mechanical parts. The vertical bevel gear is a fixed revolving center shaft around which the bevel gear or main horizontal power shaft will follow as the turret is changed in position either to right or left by shifting winds. Bearing 28 is provided with an extension 33 to which shank 34 of vane 35 is attached. Bearing 28 receives the end of shaft 29 in socket 36, whereby end thrust is prevented. Bearings 27 and 28 are preferably formed of considerable thickness to provide a wide bearing surface for the drive-shaft. The wind-wheel 37 is provided with a hub having an inward extension 38 and an outward extension 39. Radial arms 40 extend outwardly from a flange 40' on the hub to support blades 41 mounted thereon, the blades being anchored by truss-rods 42 connected thereto and to flange 43 upon extension 39.

A vertical support 44 is mounted upon bearing 27 and is provided with an upwardly extending arm 45 to which vane truss-rod 46 is connected, said rod preferably having a turn buckle 47 to take up any slack between the parts. Said support is also provided with lateral arms 48, each having a hole 49 to which truss-rods 50 having turn buckles 50' are attached. A sail 51 having standards 52 is pivotally mounted in bearings on support 44. The lower ends 54 of arms 52 are extended outwardly at an angle thereto and are connected to a cross-bar 55, thereby forming a bell-crank.

A brake-shoe 56 having an arc shaped braking surface 57 upon its upper side is mounted upon dove tailed holder 58 which in turn is mounted upon hinged plates 59 and 60. When the parts are thus assembled, the arc shaped braking surface of the brake-shoe is adapted to engage the lower side of extension 38 of the hub. The sail 51 is of oblong formation and may be constructed of sheet metal or wood. It preferably extends slightly above the upper edge of the wind-wheel to permit the wind to act freely thereon.

Weights 61 are adjustably attached to extended arms 54, capable of being slid into any required position, and normally holds brake-shoe 54 out of engagement with extended hub 38. When, however, the brake is brought into engagement with hub 38 by an excess wind upon the sail, the force thus exerted will overcome the force exerted by the weight which has been adjusted for the required speed of the wind-wheel and will bring the brake-shoe into contact with hub 38 and when the wind recedes the force of the weight will overcome the force of the wind upon the sail and the brake will automatically seek its normal position.

It will thus be seen that by means of my improved and compact construction and arrangement, I am able to dispense with the use of the tall and expensive tower construction heretofore employed in windmills; as well as dispensing with many parts. I am enabled to provide a much larger and efficient wheel mounted securely near the ground and of such dimensions as to give it a much greater leverage than could safely be provided on the high top of the ordinary tower. At the same time by means of my construction the wind-wheel is mounted at sufficient height to give it the proper aerial contact and is strong enough to withstand the wind's energy even of high velocity on the wind-wheel.

It will be further seen that by means of my construction I provide a hollow revolving turret adapted to securely house the mechanism and being provided with wide bearing surfaces and ball-bearings, it is adapted to freely turn or rotate upon the upper part of the standard. The top of the cast-iron column is preferably machined as is also the inside of the revolving turret, permitting the turret to properly revolve thereon.

When the wind is blowing at the velocity necessary to drive the wheel at the predetermined speed, there will be no frictional contact with the brake which is held out of contact with the wheel-hub by means of said weight, but when the wind is blowing at a higher speed, it will move the sail away from the wheel upon its pivotal bearing and draw the brake into contact with the wheel-hub thereby maintaining the desired speed of the wheel. As the velocity of the wind increases the pressure of the brake upon the wheel increases to retard the speed of the wheel and maintain it at the given number of revolutions required to perform its duty.

The construction is such that the wind-wheel is mounted very close to the standard so that the weight of the wheel will not tend to throw the standard out of vertical position.

My invention is not intended to displace the present windmills which have their usual use, but is intended to commence where they leave off and do heavy duty where strong winds prevail, for use in extensive irrigation and electrical generation just as an auto truck takes the place of a wheel-barrow.

The streams of the arid and semi-arid lands of the West are now well utilized by diverting dams. The entire flow of the Arkansas River for instance, has been diverted, leaving without irrigation millions of acres of land in Colorado and Kansas.

The stream flow of California, Arizona, New Mexico, Texas, and many other States is not sufficient to irrigate the arid and semi-arid lands on account of the open and sandy earth's surface in these districts. The water of streams percolates and forms subterranean reservoirs, immediately over which there is a parching desert, made so by almost constant winds. The energy of this same wind when energized mechanically by the use of this invention will bring from these subterranean reservoirs the water in copious quantities so much needed on the surface of the desert plane above for irrigation, thus being able to reclaim vast areas of arid and semi-arid lands of the West of the United States and similar lands of the world.

The peculiar construction of great rigidity of the standard used in this wind mill will enable the construction of a wind-wheel of such size the area of which will intercept a great cross-sectional area of moving air or wind which I believe is not possible in wind-wheel construction now generally used.

This arid and semi-arid land of but little value now for the reason of the lack of irrigation will become very valuable when irrigation is successful not only to privately owned lands, but the lands still held by the Government.

This invention is not only new and useful in its application for irrigation of private and public owned lands but in the reclamation of swamp lands in pumping water out, as in the reclamation of coastal Holland by the primitive and picturesque old Holland windmill.

The sail prevents the wheel from running so fast as to wreck the mill.

My invention is capable of some modification without departure from its scope and spirit as defined in the following claims.

I claim—

1. In a windmill, in combination, a standard, a turret mounted thereon, a drive-shaft mounted in said turret, a vane mounted on said turret, a vertical shaft in said standard, means on said drive-shaft adapted to actuate said vertical shaft, a wind-wheel on said drive-shaft, a pivotally mounted bell-crank on said turret having a sail thereon, and a brake pivotally mounted on said bell-crank and adapted to engage the hub of said wheel.

2. In a windmill, in combination, a hollow standard, a vertical shaft journaled therein near each end, a driven gear upon its upper end and a driving gear at its lower end, a rotatable turret on said standard having widely spaced apart bearings, a horizontal shaft mounted in said bearings, a vane on said turret, a wind-wheel mounted on said drive-shaft, a support on said turret, truss-rods connecting said vane to said support, a U-shaped bell-crank pivotally mounted on said support, a sail on said bell-crank, and a pivotally mounted brake-shoe on said bell-crank adapted to engage the hub of said wind-wheel.

3. In a windmill of the class described, in combination, a hollow rotatable turret having widely spaced apart bearings, a drive-shaft mounted therein, a wind-wheel founted on said drive-shaft and a sail mounted on said turret and having a brake thereon adapted to engage said wheel, for the purposes specified.

4. In a windmill, in combination, a standard, a rotatable turret mounted thereon, a support on said turret, a vane on said turret, truss-rods connecting said vane to said support and each having a turn-buckle, a drive-shaft mounted in said turret and having actuating means thereon, a wind-wheel mounted on said drive-shaft and a sail having braking means thereon adapted to engage said wheel.

5. In a windmill having a standard and a rotatable turret, in combination, operating mechanism mounted therein, a wind-wheel suitably mounted and adapted to actuate said operating mechanism, a support, a sail having a U-shaped bell-crank pivoted to said support and having a brake-shoe thereon, for the purposes specified.

6. In a windmill of the class described, in combination, a sail, a pivotally mounted bell-crank on which said sail is mounted, a brake-shoe mounted on said bell-crank and a weight adjustably mounted thereon, for the purposes specified.

7. In a wind-mill, in combination a standard, a rotatable hollow turret mounted thereon, and having widely spaced apart bearings, a wind-wheel having a drive-shaft mounted in said bearings, a vane attached to said turret, a support attached to said turret, truss-rods attached to said support and to said vane to hold it firmly in position relative to said turret, a U-shaped bell-crank pivotally attached to said turret and having a sail upon its upper end, an arc-shaped brake-shoe adapted to engage the lower side of said hub, and means for pivotally supporting said shoe upon said bell-crank.

8. In a windmill, in combination, a rotatably mounted turret, a wind-wheel mounted on said turret, a vane suitably mounted on said turret, a pivotally mounted bell-crank having a sail mounted upon its upper end and extending above the top of the wheel, and having its angular extension projecting toward the wheel, a brake-shoe pivotally mounted on said extension, and means for normally holding said brake-shoe out of engagement with said hub.

9. In a windmill, in combination, a base, a hollow cylindrical standard firmly mounted thereon, an annular ball-bearing groove thereon a short distance below its top, balls in said groove, a hollow turret having an upwardly outwardly flaring housing and a downwardly extending tubular bearing fitting over the upper end portion of said standard and resting upon said balls, said turret being adapted to rotate on said standard, a bearing and supporting cap mounted on the top of said standard and having a hole therethrough, a bearing near the bottom of said standard, a vertical shaft mounted in said bearings, a driven bevel gear fixed on the upper end of said shaft, a bevel gear fixed on the lower end of said shaft and adapted to actuate a geared shaft, bearings in said turret, a wind-wheel having a horizontal drive-shaft mounted in said bearings, and a bevel gear mounted on said horizontal shaft within said housing and adapted to engage and actuate said driven bevel gear, an inward cylindrical extension on said hub, a vane mounted on said turret, a support mounted on said turret, truss-rods extending from said support to said vane to steady and support said vane, ears on said support, a bell-crank pivotally mounted in said ears, a sail mounted upon the upper ends of said bell-crank, a shoe pivotally mounted on said bell-crank and having a concave braking surface adapted to engage the inner extended portion of said hub, and means to normally hold it out of contact with said hub.

10. In a windmill, in combination, a standard, a turret rotatably mounted thereon, a wind-wheel suitably mounted and having an inwardly extending hub, a vane mounted upon said turret, a sail pivotally mounted on said turret above the top of the wheel and having arms extending at an angle thereto, hinged plates on said arms, a dove tailed holder, a wood brake-shoe mounted thereon and both adapted to be securely fastened to said hinged plates.

11. In a windmill of the class described, in combination, a hollow rotatable turret having widely spaced apart bearings, a drive-shaft mounted thereon and having one end resting in a socket to provide end thrust of said drive-shaft, a wind-wheel mounted on said drive-shaft and a sail mounted on said turret and having a brake thereon adapted to engage said wheel, for the purposes specified.

LORAIN A. PEARSON.